United States Patent
Krig et al.

(10) Patent No.: US 8,756,160 B2
(45) Date of Patent: Jun. 17, 2014

(54) METHOD AND SYSTEM FOR MANAGING THE TRANSMISSION OF PROTECTED CONTENT AND LICENSES OVER MEDIA TRANSFER PROTOCOL

(75) Inventors: Scott Krig, Santa Clara, CA (US); Alexander Fainkichen, San Jose, CA (US)

(73) Assignee: Broadcom Corporation, Irvine, CA (US)

( * ) Notice: Subject to any disclaimer, the term of this patent is extended or adjusted under 35 U.S.C. 154(b) by 1890 days.

(21) Appl. No.: 11/775,597

(22) Filed: Jul. 10, 2007

(65) Prior Publication Data
US 2008/0120242 A1 May 22, 2008

Related U.S. Application Data

(60) Provisional application No. 60/866,213, filed on Nov. 16, 2006, provisional application No. 60/908,005, filed on Mar. 26, 2007.

(51) Int. Cl.
*G06F 21/10* (2013.01)

(52) U.S. Cl.
CPC ..................................... *G06F 21/10* (2013.01)
USPC .......................................................... 705/59

(58) Field of Classification Search
USPC .......................................................... 705/59
See application file for complete search history.

(56) References Cited

U.S. PATENT DOCUMENTS

2006/0190410 A1* 8/2006 Harper ............................ 705/59
2006/0294020 A1* 12/2006 Pence et al. .................... 705/59

OTHER PUBLICATIONS

"Media Transfer Protocol Implementation Details", Manders et al., Microsoft 2005 (also available at http://download.microsoft.com/download/9/8/f/98f3fe47-dfc3-4e74-92a3-088782200fe7/TWMD05003_WinHEC05.ppt.).*
"Media Transfer Protocol Implementation Details", Manders et al., Microsoft 2005 (also available at http://download.microsoft.com/download/9/8/f/98f3fe47-dfc3-4e74-92a3-088782200fe7/TWMD05003_WinHEC5.ppt.).*

* cited by examiner

*Primary Examiner* — Rutao Wu
*Assistant Examiner* — James Detweiler
(74) *Attorney, Agent, or Firm* — Brinks Gilson & Lione (57) ABSTRACT

Methods and systems for preventing reception of licensed protected content prior to reception of a license, in a content rendering device wherein, the license corresponds to the licensed protected content and to the content rendering device. The license may be stored on the content rendering device in a database that may be searchable by a key. The license and the key may be associated within a file comprising the licensed protected content. A proxy computer may handle operations for the content rendering device, a DRM license server and a content server. Media Transfer Protocol (MTP) features regarding GetDeviceInfo, SendObjectInfo and SendObjectPropList operations may be utilized to activate DRM license protection for receiving the license prior to the corresponding license protected content. The content rendering device may reject transmission of and reject rendering the corresponding license protected content if the license is not resident in its database.

30 Claims, 4 Drawing Sheets

FIG. 4

METHOD AND SYSTEM FOR MANAGING THE TRANSMISSION OF PROTECTED CONTENT AND LICENSES OVER MEDIA TRANSFER PROTOCOL

CROSS-REFERENCE TO RELATED APPLICATIONS/INCORPORATION BY REFERENCE

This application makes reference to and claims priority to U.S. Provisional Application Ser. No. 60/866,213, filed on Nov. 16, 2006, entitled "METHOD AND SYSTEM FOR MEDIA TRANSFER PROTOCOL ENHANCEMENT TO OPTIMIZE WINDOWS MEDIA DIGITAL RIGHTS MANAGEMENT LICENSING PROCESS," which is hereby incorporated herein by reference in its entirety.

This application makes reference to and claims priority to U.S. Provisional Application Ser. No. 60/908,005, filed on Mar. 26, 2007, entitled "METHOD AND SYSTEM FOR ENFORCING DIGITAL RIGHTS MANAGEMENT (DRM) LICENSE TRANSMISSION PRIOR TO COMMUNICATION OF CORRESPONDING CONTENT," which is hereby incorporated herein by reference in its entirety.

FIELD OF THE INVENTION

Certain embodiments of the invention relate to securing media content. More specifically, certain embodiments of the invention relate to a method and system for managing the transmission of protected content and licenses over Media Transfer Protocol.

BACKGROUND OF THE INVENTION

The Media Transfer Protocol (MTP) is an extension of the industry standard picture transfer protocol (PTP). The media transfer protocol was created as an extension to the picture transfer protocol for media devices and includes various provisions for digital rights management (DRM).

Digital rights management (DRM) and electronic license management technologies may be utilized for home video, music, consumer and enterprise software markets. Motion picture studios, cable and satellite TV operators, consumer electronics companies and personal computer manufacturers use DRM technologies to prevent the unauthorized duplication, reception or use of copyrighted video materials.

PIMA 15740:2000 provides a common communication mechanism for exchanging images with and between digital still photography devices (DSPDs). This includes communication between digital still photography devices and host computers, printers, other digital still devices, telecommunications kiosks, and image storage and display devices. This standard presents a protocol that is intended to be transport and platform independent. The purpose of this intent is to enable standard behavior by allowing implementation of the protocol in a variety of standard transports. Exemplary transports include USB (Universal Serial Bus), IEEE 1394, and IrDA (Infrared Data Association).

Currently, the MTP spec allows for digital rights management (DRM) licenses and certificates to be sent from host servers to content rendering devices. Typically, these transmissions are handled by a proxy computer, for example a personal computer or laptop. However, the MTP spec allows for DRM protected content to be transmitted to a content rendering device without a corresponding DRM license. The MTP spec lacks a clear and standardized method for developers of multimedia technology with regard to enforcing the transmission of DRM licenses prior to corresponding DRM protected content.

Further limitations and disadvantages of conventional and traditional approaches will become apparent to one of skill in the art, through comparison of such systems with the present invention as set forth in the remainder of the present application with reference to the drawings.

BRIEF SUMMARY OF THE INVENTION

A system and/or method for managing the transmission of protected content and licenses over Media Transfer Protocol, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

DETAILED DESCRIPTION OF THE INVENTION

Certain aspects of the invention may be found in a method and system for managing the transmission of protected content and licenses over Media Transfer Protocol. Aspects of the invention may comprise a content rendering device, for example a portable or handheld digital media device and a proxy computer for example a personal computer (PC) or laptop that enables downloading of license protected media content files to the media player. The MTP feature to manage the transmission of protected content and licenses may enable and enforce one or more processes for downloading a DRM license to a content rendering device prior to downloading a file comprising DRM license protected content. In this regard, a license will be present when the file is downloaded.

Figure 1:
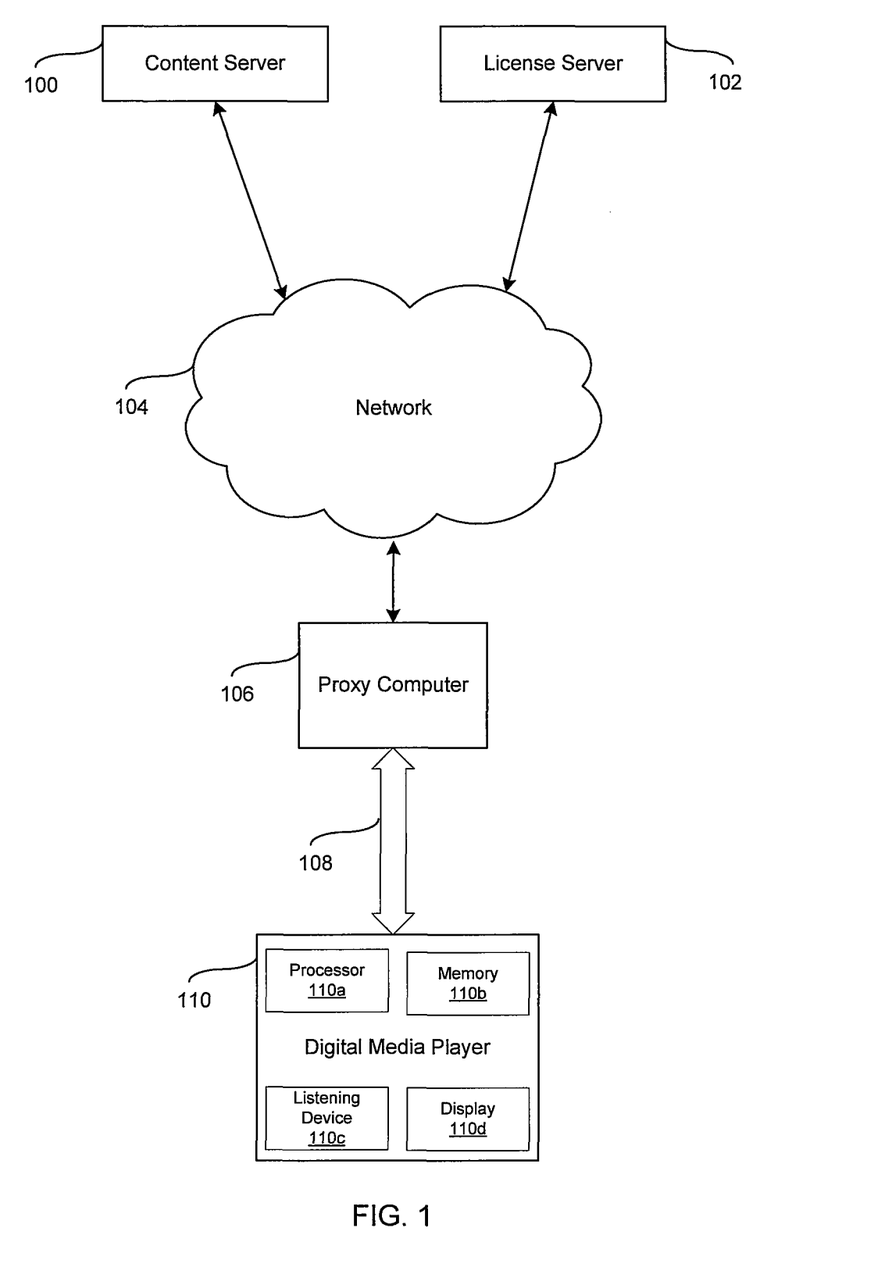
FIG. 1 is a block diagram that illustrates an exemplary system that enables transmission of license protected content to a content rendering device.

FIG. 1 is a block diagram that illustrates an exemplary system for transmitting and rendering digital media that enables an MTP enhancement to optimize DRM license processing in accordance with an embodiment of the invention. Referring to FIG. 1, there is shown a content server 100, a license server 102, a network 104, a proxy computer 106, an enhancement of MTP protocol 108 and a digital media player 110.

The content server 100 may comprise suitable logic, circuitry and/or code to enable storage and distribution of media content files to various computers and media devices via a network 104. The content server 100 may for example, distribute content to users of an on-line music store. The content server 100 may be communicatively coupled via the network 104 with a proxy computer 106 or directly with a digital media player 110. The content server 100 may support the MTP protocol and DRM.

The license server 102 may generate and distribute licenses for protected media content. For example, the license server 102 may be a DRM license server which may utilize MTP to distribute licenses to the digital media player 110 directly or via the proxy computer 106. The license server 102 may be communicatively coupled with the proxy computer 106 or directly to the digital media player 110 via the network 104. The license server 102 may support the MTP protocol and DRM.

The network 104 may be a public network that comprises suitable logic, circuitry and/or code to support communication services between various distributed devices. The network 104 may be communicatively coupled with the content server 100, the license server 102 and the proxy computer 106 or directly to the digital media player 110.

The proxy computer 106 may comprise suitable logic, circuitry and/or code to enable management of media content and license acquisition for the for the digital media player 110. The proxy computer 106 may for example be a personal computer or laptop. The management of media and license acquisition functionality and the content rendering functionality may be enabled by one same device and thus eliminate the need for a proxy. The proxy computer 106 may be communicatively coupled with the content server 100 and the license server 102 via the network 104 and the digital media player 110. The proxy computer 106 may support the MTP protocol and DRM.

The MTP protocol 108 enables transfer of media content between various devices and may be enhanced to enable enforcement of a license protected media content downloading process wherein a digital media player may be prevented from receiving license protected media content prior to the acquisition of a corresponding license or certificate. The MTP protocol 110 may support DRM license processes.

In various embodiments of the invention, the MTP protocol 108 may comprise modified specifications within the MTP architecture. For example the DeviceInfo dataset may be utilized to indicate whether a digital media player 110 can support the MTP enhancement according to an MTP version or MTP Extension parameter as shown in Table 1 below:

TABLE 1

| Dataset field | Field order | Size (bytes) | Datatype |
|---|---|---|---|
| Standard Version | 1 | 2 | UINT16 |
| MTP Vendor Extension ID | 2 | 4 | UINT32 |
| MTP Version | 3 | 2 | UINT16 |
| MTP Extensions | 4 | Variable | String |
| Functional Mode | 5 | 2 | UINT16 |
| Operations Supported | 6 | Variable | Operation Code Array |
| Events Supported | 7 | Variable | Event Code Array |
| Device Properties Supported | 8 | Variable | Device Property Code Array |
| Capture Formats | 9 | Variable | Object Format Code Array |
| Playback Formats | 10 | Variable | Object Format Code Array |
| Manufacturer | 11 | Variable | String |
| Model | 12 | Variable | String |
| Device Version | 13 | Variable | String |
| Serial Number | 14 | Variable | String |
| Dataset field | Field order | Size (bytes) | Datatype |

In addition, there may be several alternative methods to enforce downloading of a DRM license prior to downloading DRM protected content. For example, a SendObjectInfo operation may be utilized to notify the digital media player 110 that the proxy computer 106 is planning to send a DRM protected content file. Parameters within the SendObjectInfo operation may provide information regarding the protected content file such that the digital media player may determine whether to accept or reject the file transmission and how to allocate resources for the file if it is accepted as shown in Table 2.

A parameter for the Data field may comprise a modified ObjectInfo dataset providing a license look-up key that enables the digital media player to determine if the corresponding license is stored in its database. In addition, a new ResponseCode Option may be provided for rejecting a license protected content file if the DRM license is not found in the license database.

TABLE 2

| Parameter | Value |
|---|---|
| Operation Code | 0x100C |
| Operation Parameter 1 | [Destination StorageID on responder] |
| Operation Parameter 2 | [Parent ObjectHandle on responder where object should be placed] |
| Operation Parameter 3 | None |
| Operation Parameter 4 | None |
| Operation Parameter 5 | None |
| Data | ObjectInfo dataset |
| Data Direction | I->R |
| ResponseCode | OK, Operation_Not_Supported, Session_Not_Open, |
| Options | Invalid_TransactionID, Access_Denied, Invalid_StorageID, Store_Read_Only, Object_Too_Large, Store_Full, Invalid_ObjectFormatCode, Store_Not_Available, Parameter_Not_Supported, Invalid_ParentObject, Invalid_Dataset, Specification_Of_Destination_Unsupported, DRM_license_ID not_found |
| Response Parameter 1 | Responder StorageID in which the object will be stored |
| Response Parameter 2 | Responder parent ObjectHandle in which the object will be stored |
| Response Parameter 3 | Response Parameter3: responder's reserved ObjectHandle for the incoming object |
| Response Parameter 4 | None |
| Response Parameter 5 | None |

The SendObjectInfo operation may be sent to the digital media player with a modified ObjectInfo dataset which may comprise a new parameter DRM License Lookup Key as shown in Table 3.

TABLE 3

| Dataset field | Field order | Size (bytes) | Datatype | Required for SendObjectInfo |
|---|---|---|---|---|
| StorageID | 1 | 4 | StorageID | No |
| Object Format | 2 | 2 | ObjectFormatCode | Yes |
| Protection Status | 3 | 2 | UINT16 | No |
| Object Compressed Size | 4 | 4 | UINT32 | Yes |
| *Thumb Format | 5 | 2 | ObjectFormatCode | No |
| *Thumb Compressed Size | 6 | 4 | UINT32 | No |
| *Thumb Pix Width | 7 | 4 | UINT32 | No |
| *Thumb Pix Height | 8 | 4 | UINT32 | No |
| Image Pix Width | 9 | 4 | UINT32 | No |
| Image Pix Height | 10 | 4 | UINT32 | No |
| Image Bit Depth | 11 | 4 | UINT32 | No |
| Parent Object | 12 | 4 | ObjectHandle | No |
| Association Type | 13 | 2 | Association Code | Yes |
| Association Description | 14 | 4 | AssociationDesc | Yes |
| *Sequence Number | 15 | 4 | UINT32 | No |
| Filename | 16 | Variable | String | Yes |
| Date Created | 17 | Variable | DateTime String | No |
| Date Modified | 18 | Variable | DateTime String | No |
| Keywords | 19 | Variable | String | No |
| DRM License Lookup Key | 20 | 4 | UINT32 | Yes (if content is protecded) |

The DRM License Look-up Key may be be used to identify a DRM license uniquely. The license look-up key may be implemented in a plurality of ways. For example, the look-up key may be an array, a 64 bit integer, a 32 bit integer or any other suitable method may be utilized. The DRM License Look-up Key may be associated with DRM protected content information contained in the DRM protected file header.

In addition, the DRM License Look-up Key may be utilized to lookup and verify a license within the digital media player's local DRM license database. If the license is not found in the database, the digital media player 110 may choose not to receive the protected media content. Without the DRM license, the DRM protected content may not be unplayable. The device may return a new status code DRM_license_ID not_found_status to inform the MTP initiator that it is rejecting the protected content until the DRM license is received.

In another embodiment of the invention, the MTP operation SendObjectPropList may be may be utilized in a manner similar to the SendObjectInfo operation. The SendObjectPropList operation may be sent to the digital media player from the proxy computer 106 with a modified ObjectPropList dataset which may comprise a new parameter DRM License Lookup Key. Also, a new Response Code Option for indicating that the DRM license was not found in the license database of the digital media player as shown in Table 4:

TABLE 4

| Parameter | Value |
|---|---|
| Operation Code | 0x9808 |
| Operation Parameter 1 | [Destination StorageID on responder] |
| Operation Parameter 2 | [Parent ObjectHandle on responder where object should be placed] |
| Operation Parameter 3 | ObjectFormatCode |
| Operation Parameter 4 | ObjectSize [most significant 4 bytes] |
| Operation Parameter 5 | ObjectSize [least significant 4 bytes] |
| Data | ObjectPropList dataset - May contain DRM license look-up key |
| Data Direction | I->R |
| ResponseCode | OK, Operation_Not_Supported, Session_Not_Open, |
| Options | Invalid_TransactionID, Access_Denied, Invalid_StorageID, Store_Read_Only, Store_Full, Invalid_ObjectFormatCode, |

TABLE 4-continued

| Parameter | Value |
|---|---|
| | Store_Not_Available, Parameter_Not_Supported, Invalid_ParentObject, Invalid_Dataset, Property_Not_Supported, Invalid_ObjectProp_Format, Invalid_ObjectProp_Value, Invalid_ObjectHandle, Object_Too_Large, Store_Full, Specification_Of_Destination_Unsupported, DRM license ID not found |
| Response Parameter 1 | Responder StorageID in which the object will be stored |
| Response Parameter 2 | Responder parent ObjectHandle in which the object will be stored |
| Response Parameter 3 | Responder's reserved ObjectHandle for the incoming object |
| Response Parameter 4 | [Index of failed property] |
| Response Parameter 5 | None |

The ObjectPropList operation Data parameter may comprise an array of property descriptions for a file or object that may be transmitted to the digital media player 110. In this regard, the digital media player may determine whether to accept or reject the file and how to allocate resources for the file if it is accepted. A new property description, ObjectPropDesc, may be added to the array of property descriptions to provide the DRM license lookup key as shown in Table 5. This property identifies the key into the DRM license database on the digital media player and may be used for looking up the presence of the DRM license. This property may be used for many license management related purposes.

TABLE 5

| Field name | Field order | Size (bytes) | Datatype | Value |
|---|---|---|---|---|
| PropertyCode | 1 | 2 | UINT16 | 0xDD76 (or other value) |
| Datatype | 2 | 2 | UINT16 | 0x0006 (UINT32) |
| Get/Set | 3 | 1 | UINT8 | 0x00 (GET) |
| DefaultValue | 4 | 4 | UINT32 | 0x0000 |
| GroupCode | 5 | 4 | UINT32 | Device-defined |
| FormFlag | 6 | 1 | UINT8 | 0x00 None |

The digital media player 110 may comprise a suitable processor 110a to enable downloading of one or more DRM licenses and corresponding DRM licensed media content. The digital media player 110 may comprise memory 110b enabling storing of media content and one or more databases comprising DRM license information. The digital media player 110 may render the licensed media content via a speaker or listening device 110c. Information regarding the DRM licensed media content may be visually displayed by the display 110d. The digital media player 110 may be communicatively coupled with the content server 100 and the license server 102 and the network 104 directly or via the proxy computer 106. The digital media player 110 may support the MTP protocol and DRM.

In operation, a digital media player 110 may be coupled with a proxy computer 106. The Proxy computer is coupled with a content server 100 and a license server 102 via a network 104. A user may execute an application on a proxy computer to download one or more license protected media content files from the content server 100 as well as one or more corresponding licenses from the license server 102 and transfer the received one or more files and licenses to the digital media player 110. The Media Transfer Protocol (MTP) may be utilized to enable transfer of media files between the servers 100 and 102, personal computer 106 and digital media player 110. The license server may for example generate and distribute Digital Rights Management (DRM) licenses. Prior to transferring a protected media content file to a digital media player, the digital media player 110 may verify the presence of a corresponding license and may accept or reject the content based on the presence of the corresponding license.

Figure 2:
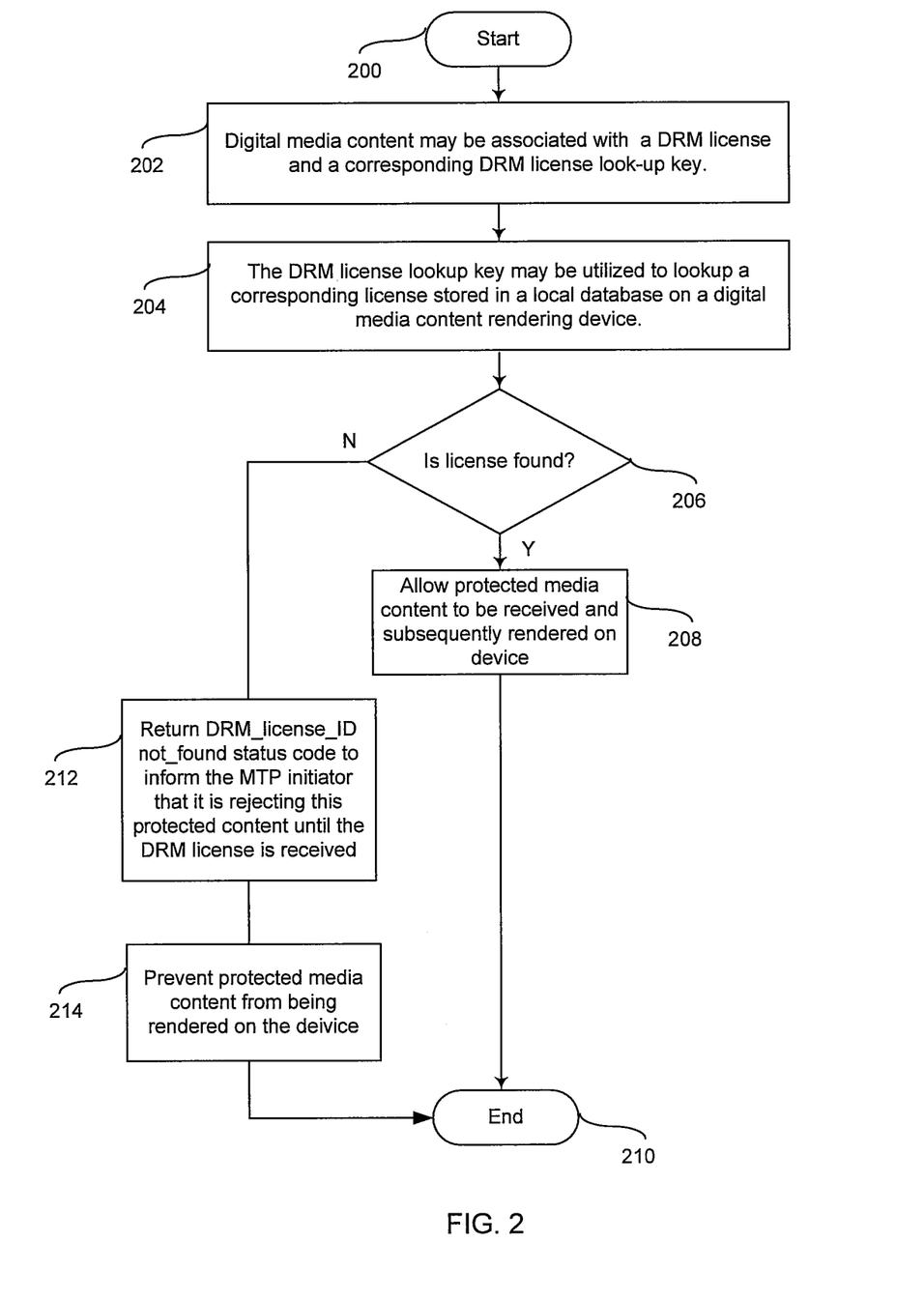
FIG. 2 is a flow chart that illustrates exemplary steps for transmission of license protected content to a content rendering device.

FIG. 2 is a flow chart that illustrates exemplary steps taken prior to rendering license protected digital media content on a content rendering device such as, for example, a digital media player shown in block 110 of FIG. 1, in accordance with an embodiment of the invention. Referring to FIG. 2, the process begins in step 200. In step 202, digital media content may be associated with a Digital Rights Management (DRM) license and a corresponding license look-up key. The DRM license look-up key information may be stored in a header of a file comprising the digital media content. In step 204, the DRM license look-up key may be sent to the digital media player 110 and may be utilized to look up the corresponding license which may be stored in a local database therein. In step 206, the digital media player 110 may search its local database and if the corresponding license is found and valid, the process may proceed to step 208. In step 208, the digital media player 110 may allow rendering of the corresponding license protected content. In step 206, if the corresponding license is not found, the process may proceed to step 212. In step 212, the digital media player may send a media transfer protocol (MTP) status code rejecting the license protected digital media content. In step 214, the digital media player 110 may prevent rendering of the DRM license protected content.

Figure 3:
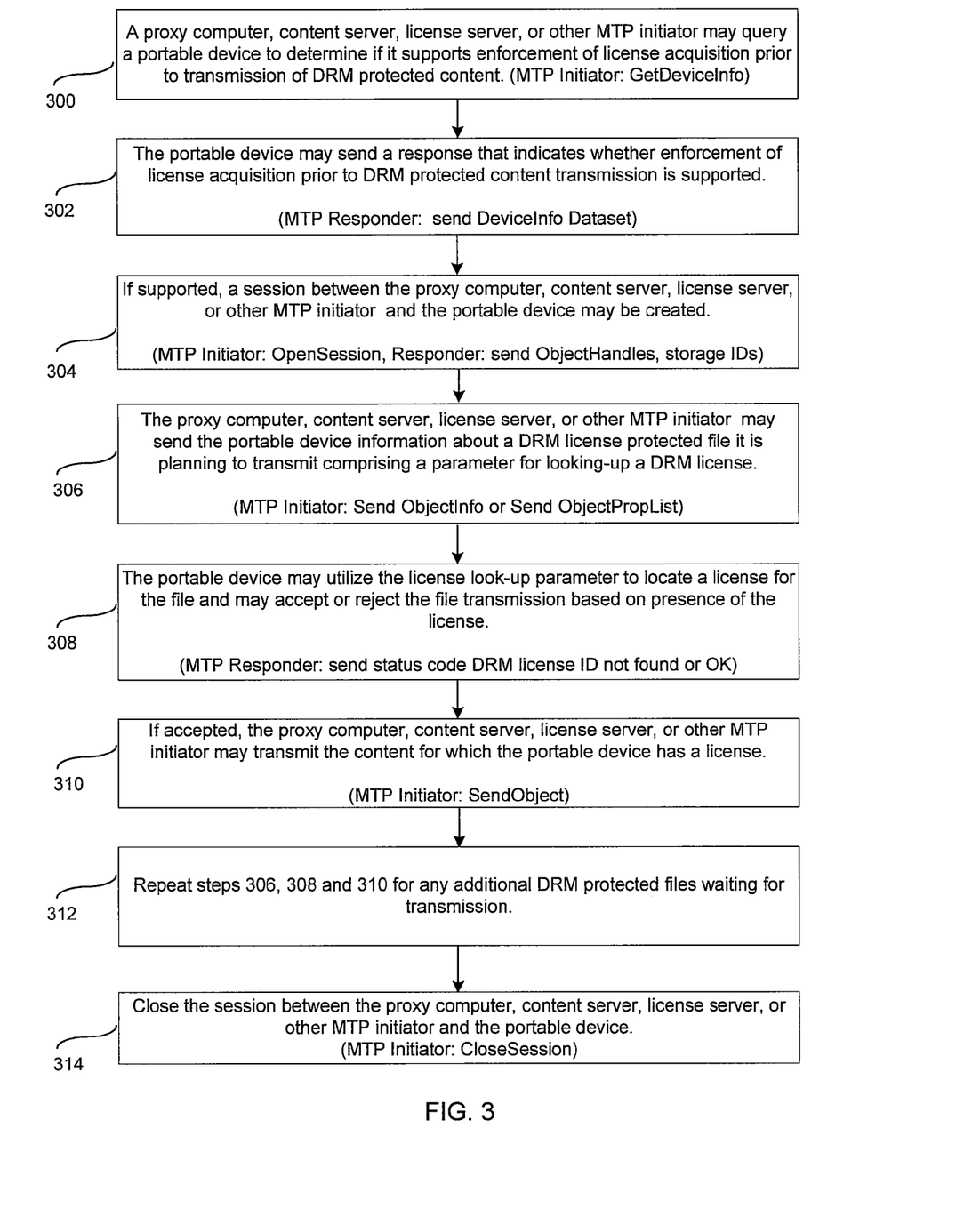
FIG. 3 is a flow chart that illustrates exemplary steps for transmission of protected content to a content rendering device utilizing Media Transfer Protocol (MTP).

FIG. 3 is a flow chart that illustrates exemplary steps for utilizing a proxy computer which may be for example a personal computer (PC) as shown in block 106 of FIG. 1 and an enhancement to Media Transfer Protocol (MTP) 108 to enforce acquisition of a Digital Rights Management (DRM) license prior to acquisition of corresponding DRM license protected content to a content rendering device such as, for example, a digital media player 110 shown in FIG. 1.

In step 300, a proxy computer 106, as MTP initiator, may attempt to determine whether a digital media player 110 supports the MTP enhancement to enforce acquisition of a DRM license prior to downloading of DRM license protected content utilizing the MTP command GetDeviceInfo. In step 302, as MTP responder, the digital media player 110 may send a DeviceInfo-Dataset to the PC 106 indicating support of the MTP enhancement via one of the dataset fields as shown above in Table 1. In step 304, the PC may create a session with the digital media player 110 utilizing an OpenSession Create MTP command. The digital media player may respond with object handles and storage locations to assist in the transmission of the DRM license protected content file. In step 306, the proxy computer 106 may send a SendObjectInfo operation to the digital media player 110 to provide information about the file it's planning to transmit and comprising a DRM license lookup key. In another embodiment of the invention, the proxy computer may send a SendObjectPropList operation instead of the SendObjectInfo operation. In this regard, the DRM license lookup key could be provided in a similar manner. In step 308, the digital media player may utilize the license lookup key to uniquely identify a DRM license corresponding to the DRM license protected content within a local database. The license look-up key may be implemented in a plurality of ways. For example, the look-up key may be an array, a 64 bit integer, a 32 bit integer or any other suitable method may be utilized. The digital media player 110 may return a response code. An "Ok" response code may be returned if a valid license is found in the database. A response code rejecting the DRM license protected content file may be returned if a valid license is not found. In step 310, the proxy computer 106 may transmit the DRM license protected content if the corresponding license was found in the local database. In step 312, steps 306, 308 and 310 may be repeated for any additional files the proxy computer 106 may plan to transmit to the digital media player. In step 314, the proxy computer 106, as MTP initiator may close the session with a CloseSession operation.

Figure 4:
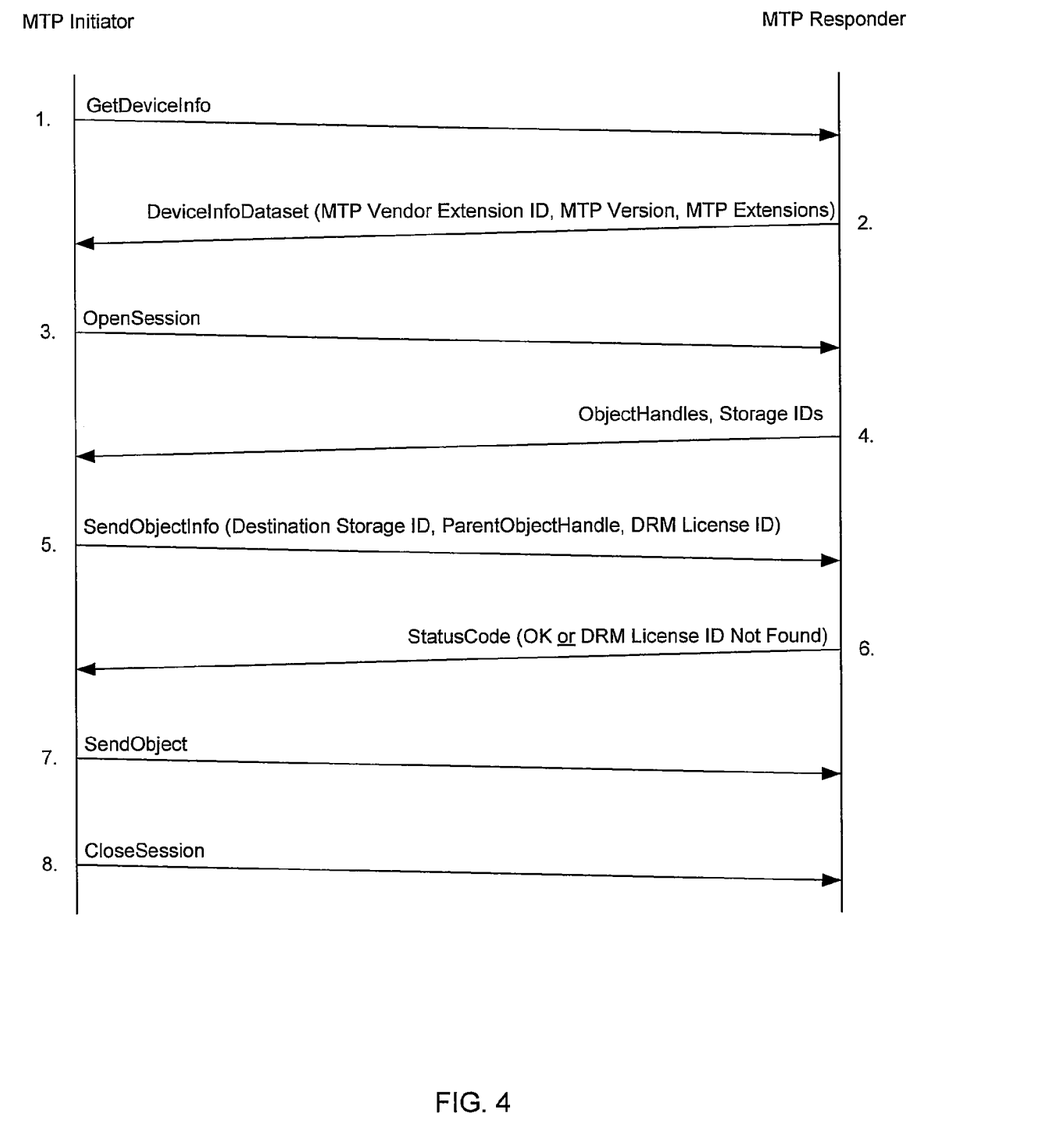
FIG. 4 is a flow diagram that illustrates exemplary steps for MTP enhancement feature operations.

FIG. 4 is a flow diagram of exemplary media transfer protocol (MTP) operations implementing reception of a Digital Rights Management (DRM) license prior to reception of DRM license protected content. As shown in FIG. 4, the SendObjectInfo command may be utilized to determine whether a license may be resident on the digital media player 110 prior to sending the license protected content. An MTP initiator may be the content server 100, the proxy computer 106, the license server 102 or another suitable device. An MTP responder may be the digital media player 110 for example, or another suitable content rendering device. In step 1, the MTP initiator sends a GetDeviceInfo operation to the MTP responder. This step may be implemented to determine whether the MTP responder supports the MTP enhancement feature for reception of DRM license prior to reception of DRM license protected content and may be executed prior to opening an MTP session. In step 2, the MTP responder may return a DeviceinfoDataSet indicating which MTP features are supported. In step 3, the MTP initiator may send an OpenSession operation to the MTP responder comprising a SessionID. In step 4, the MTP responder returns Object Handles and/or Storage IDs if necessary. In step 5, the MTP initiator sends a SendObjectInfo operation to the MTP responder comprising parameters for DestinationStorageID on responder, ParentObjectHandle on responder where object should be placed and, a DRM license ID for the corresponding license protected content. In step 6, after the responder determines whether the DRM license is already resident on the responder, the responder returns an OK or a DRM license ID not found response. In step 7, if the response in step 6 indicated that the DRM license was found, the MTP initiator may send a SendObject operation to the MTP responder. When the MTP responder receives the SendObject operation, it may write the object to storage. In step 8, the MTP initiator may send a CloseSession operation to the MTP responder.

In an embodiment of the invention, referring to FIG. 1, a content rendering device 110 may receive a license prior to receiving corresponding license protected content. In this regard, the license may uniquely correspond to the content and to the content rendering device 110. The license may be stored on the content rendering device 110 in a database that may be searchable by a key. The license and the key into the searchable database may be associated within a file comprising the corresponding license protected content. In this regard, the license may be generated by Digital Rights Management (DRM) license server 102. In addition, the corresponding license protected content may be distributed by content server 100. Both the DRM license and the license protected content may be sent to the content rendering device 110 via a proxy computer 106.

Media Transfer Protocol (MTP) operation feature may be utilized to activate the prevention of receiving a license prior to receiving corresponding license protected content on the content rendering device 110. The content rendering device may indicate its support of the MTP operation enhancements within a response to a GetDeviceInfo operation. A SendObjectInfo operation may provide the key into the searchable database for DRM licenses on the content rendering device. The content rendering device may indicate that the corresponding license is resident in its database via a response to the SendObjectInfo operation. In another embodiment of the invention, a SendObjectPropList operation may provide the key into the searchable database for DRM licenses, to the content rendering device. The content rendering device may indicate that the corresponding license is resident in its database within a response to the SendObjectPropList operation. Accordingly, the content rendering device may reject the transmission of the corresponding license protected content if the license is not resident in its database. Additionally, the content rendering device may refuse to render corresponding license protected content if the license is not resident in its database.

Certain embodiments of the invention may comprise a machine-readable storage having stored thereon, a computer program having at least one code section for media transfer protocol feature for managing the transmission of protected content and licenses over Media Transfer Protocol, the at least one code section being executable by a machine for causing the machine to perform one or more of the steps described herein.

Accordingly, aspects of the invention may be realized in hardware, software, firmware or a combination thereof. The invention may be realized in a centralized fashion in at least one computer system or in a distributed fashion where different elements are spread across several interconnected computer systems. Any kind of computer system or other apparatus adapted for carrying out the methods described herein is suited. A typical combination of hardware, software and firmware may be a general-purpose computer system with a computer program that, when being loaded and executed, controls the computer system such that it carries out the methods described herein.

One embodiment of the present invention may be implemented as a board level product, as a single chip, application specific integrated circuit (ASIC), or with varying levels integrated on a single chip with other portions of the system as separate components. The degree of integration of the system will primarily be determined by speed and cost considerations. Because of the sophisticated nature of modern processors, it is possible to utilize a commercially available processor, which may be implemented external to an ASIC implementation of the present system. Alternatively, if the processor is available as an ASIC core or logic block, then the commercially available processor may be implemented as part of an ASIC device with various functions implemented as firmware.

The present invention may also be embedded in a computer program product, which comprises all the features enabling the implementation of the methods described herein, and which when loaded in a computer system is able to carry out these methods. Computer program in the present context may mean, for example, any expression, in any language, code or notation, of a set of instructions intended to cause a system having an information processing capability to perform a particular function either directly or after either or both of the following: a) conversion to another language, code or notation; b) reproduction in a different material form. However, other meanings of computer program within the understanding of those skilled in the art are also contemplated by the present invention.

While the invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiments disclosed, but that the present invention will include all embodiments falling within the scope of the appended claims.

What is claimed is:

1. A method for securing media content, the method comprising:
   in a content rendering device:
      receiving a license prior to receiving corresponding licensed protected content by said content rendering device, wherein said license is received by said content rendering device via one or both of Media Transfer Protocol (MTP) and Enhanced Media Transfer Protocol operations; and
      rendering said received corresponding licensed protected content.

2. The method according to claim 1, wherein said license uniquely corresponds to said licensed protected content.

3. The method according to claim 1, wherein said license uniquely corresponds with said content rendering device.

4. The method according to claim 1, comprising storing said license on said content rendering device within a database searchable by a key.

5. The method according to claim 4, comprising associating said license and said key within a file comprising said corresponding licensed protected content.

6. The method according to claim 1, wherein said corresponding licensed protected content is received by said content rendering device via media transfer protocol.

7. The method according to claim 1, comprising receiving said license and said corresponding licensed protected content by said content rendering device via a proxy computer.

8. The method according to claim 1, comprising indicating support of said enhanced MTP operations via a response to a GetDeviceInfo operation from said content rendering device.

9. The method according to claim 1, comprising receiving a key into a searchable database for DRM license storage to said content rendering device via a SendObjectInfo operation.

10. The method according to claim 9, comprising indicating via a response to said SendObjectInfo operation that said license is resident on said content rendering device.

11. The method according to claim 1, comprising receiving a key into a searchable database for DRM license storage to said content rendering device via a SendObjectPropList operation.

12. The method according to claim 11, comprising indicating via a response to said SendObjectPropList operation that said license is resident on said content rendering device.

13. The method according to claim 1, comprising rejecting transmission of said corresponding licensed protected content in instances when said license is not resident on said content rendering device.

14. The method according to claim 13, comprising indicating rejection of said corresponding licensed protected content with a media transfer protocol response code.

15. The method according to claim 1, comprising rejecting rendering of said corresponding licensed protected content on said content rendering device in instances when license is not resident on said content rendering device.

16. A system for securing media content, the system comprising:
one or more processors of a content rendering device, said one or more processors comprising circuitry and being operable to:
receive a license prior to receiving corresponding licensed protected content by said content rendering device, wherein said license is received by said content rendering device via one or both of Media Transfer Protocol (MTP) and Enhanced Media Transfer Protocol operations; and
render said received corresponding licensed protected content.

17. The system according to claim 16, wherein said license uniquely corresponds to said licensed protected content.

18. The system according to claim 16, wherein said license uniquely corresponds with said content rendering device.

19. The system according to claim 16, wherein said processor is operable to store said license on said content rendering device within a database searchable by a key.

20. The system according to claim 19, wherein said processor is operable to associate said license and said key within a file comprising said corresponding licensed protected content.

21. The system according to claim 16, wherein said corresponding licensed protected content is received by said content rendering device via media transfer protocol.

22. The system according to claim 16, wherein said processor enables receiving of said license and said corresponding licensed protected content by said content rendering device via a proxy computer.

23. The system according to claim 16, wherein said processor is operable to indicate support of said enhanced MTP operations via a response to a GetDeviceInfo operation from said content rendering device.

24. The system according to claim 16, wherein said processor is operable to receive a key into a searchable database for DRM license storage to said content rendering device via a SendObjectInfo operation.

25. The system according to claim 24, wherein said processor is operable to indicate via a response to said SendObjectInfo operation that said license is resident on said content rendering device.

26. The system according to claim 16, wherein said processor is operable to receive a key into a searchable database for DRM license storage to said content rendering device via a SendObjectPropList operation.

27. The system according to claim 26, wherein said processor is operable to indicate via a response to said SendObjectPropList operation that said license is resident on said content rendering device.

28. The system according to claim 16, wherein said processor is operable to reject transmission of said corresponding license protected content in instances when said license is not resident on said content rendering device.

29. The system according to claim 28, wherein said processor is operable to indicate rejection of said corresponding licensed protected content with a media transfer protocol response code.

30. The system according to claim 16, wherein said processor is operable to reject rendering of said corresponding license protected content on said content rendering device in instances when license is not resident on said content rendering device.

* * * * *